Jan. 6, 1931.   D. FABIO   1,788,088
AUTOMOBILE SEAT STRUCTURE
Filed June 19, 1929   5 Sheets-Sheet 1
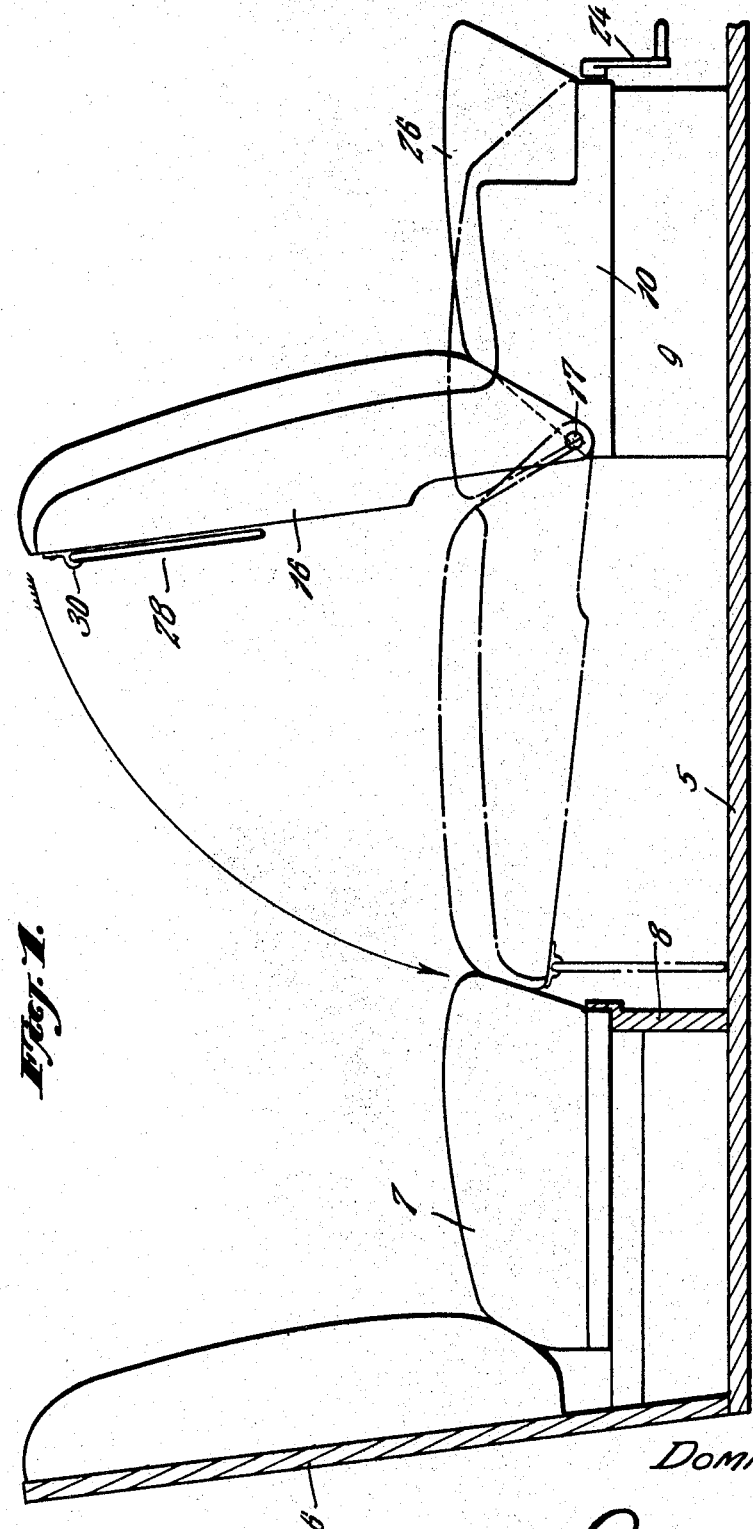
Inventor
DOMINICK FABIO.
By *Clarence A. O'Brien*
Attorney Jan. 6, 1931. D. FABIO 1,788,088
AUTOMOBILE SEAT STRUCTURE
Filed June 19, 1929 5 Sheets-Sheet 2
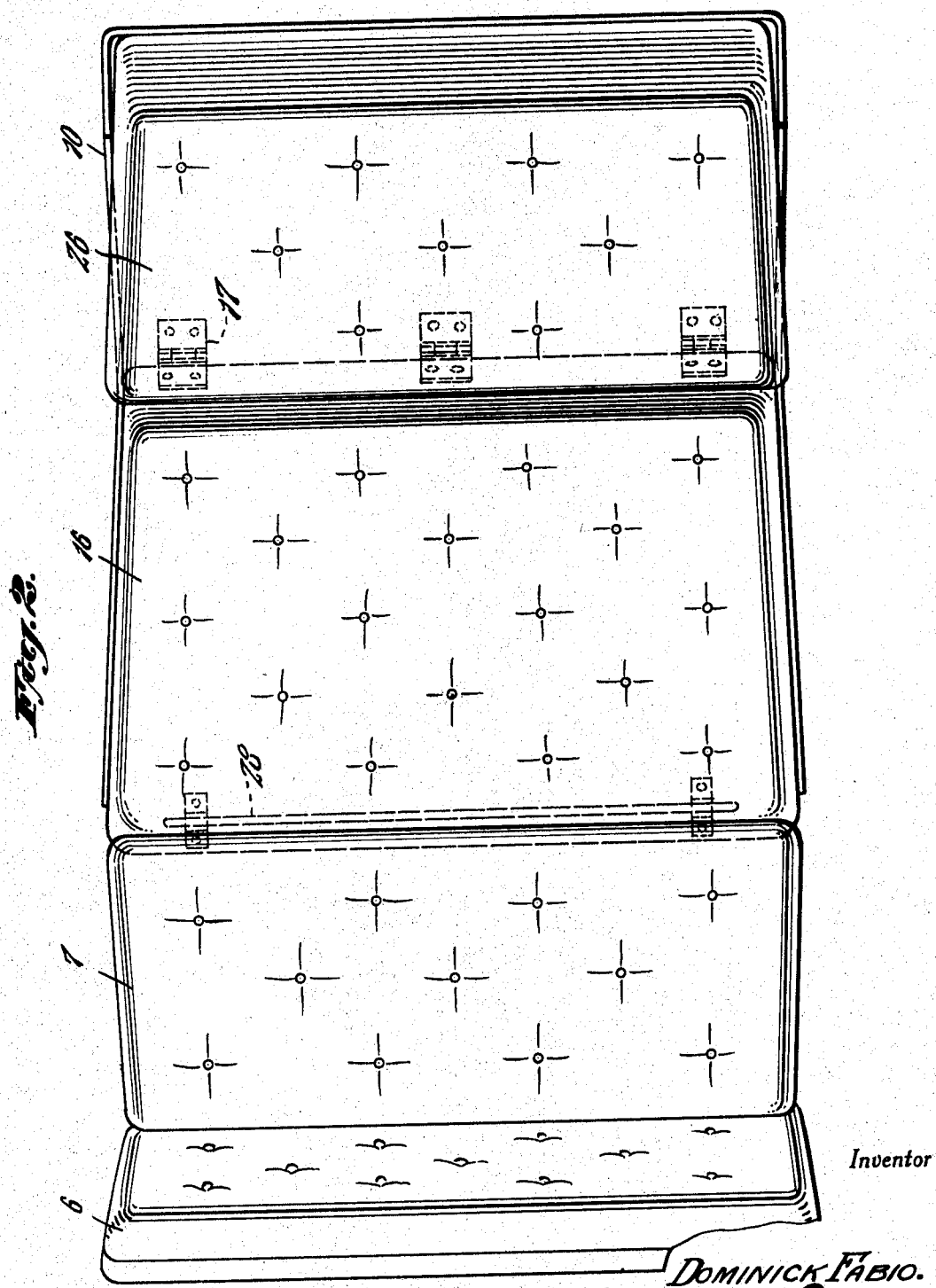
Inventor
DOMINICK FABIO.
By Clarence A. O'Brien
Attorney

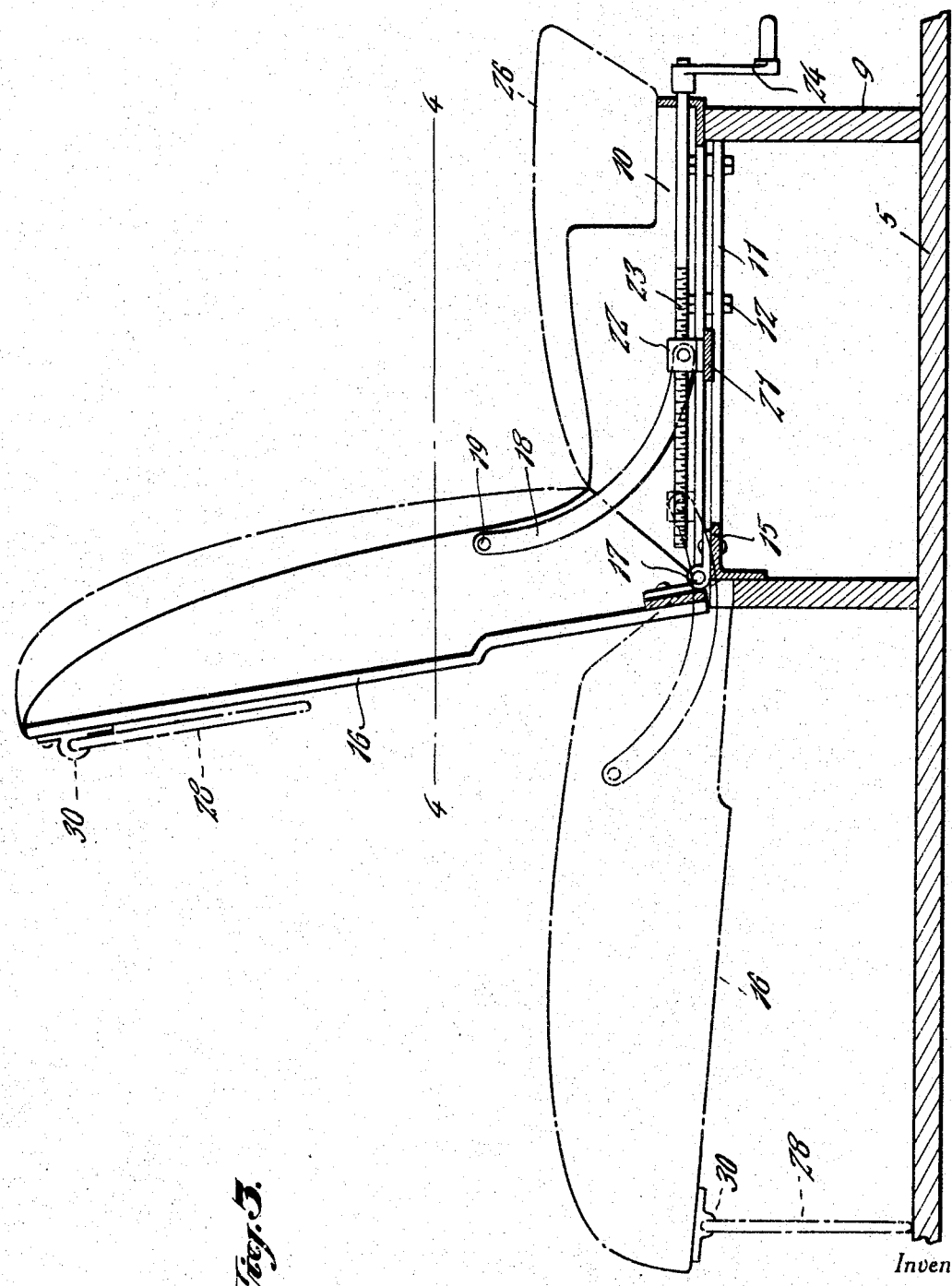

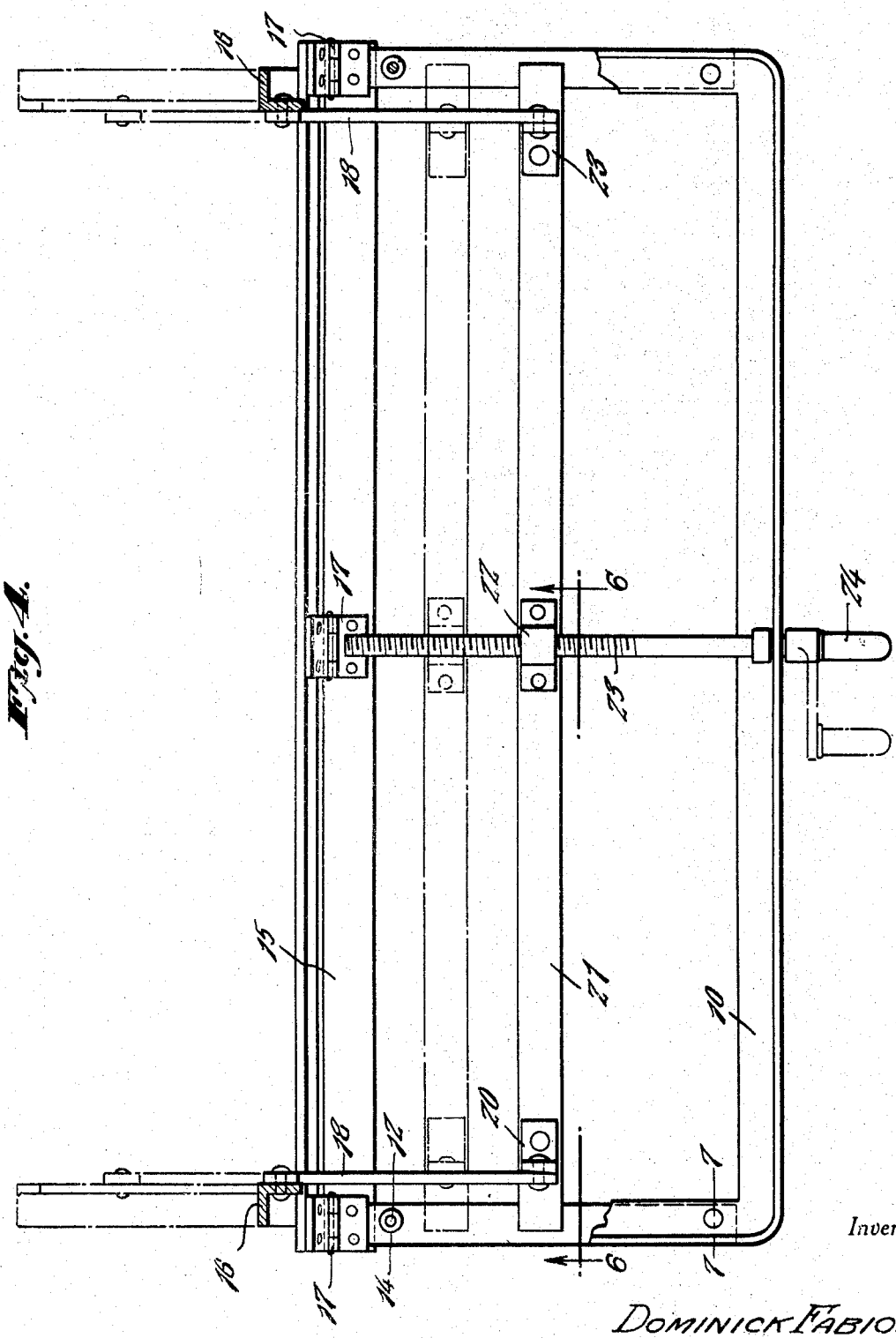

Jan. 6, 1931.  D. FABIO  1,788,088
AUTOMOBILE SEAT STRUCTURE
Filed June 19, 1929  5 Sheets-Sheet 5
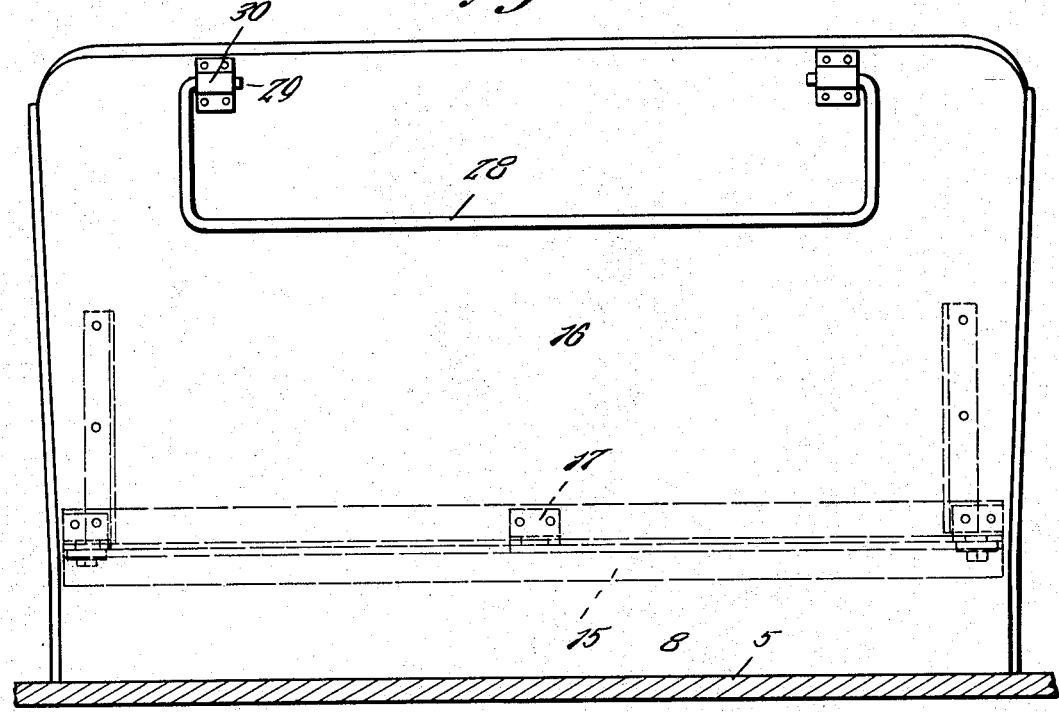
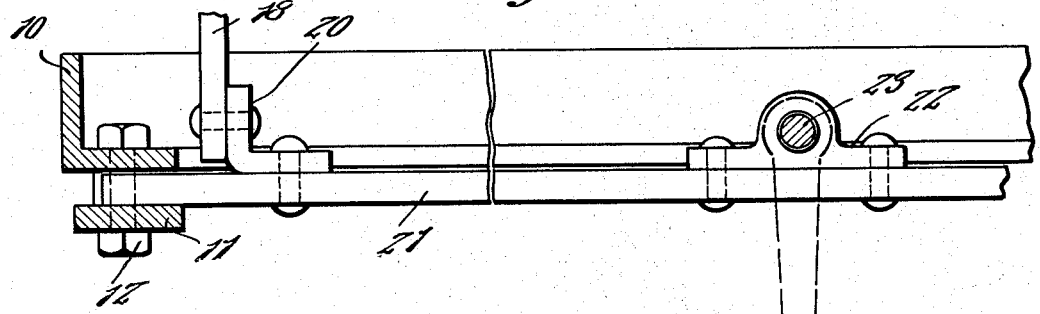
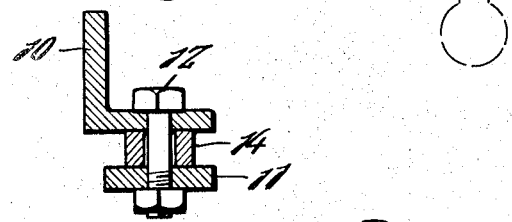
Inventor
DOMINICK FABIO.
By Clarence A. O'Brien
Attorney Patented Jan. 6, 1931

1,788,088

UNITED STATES PATENT OFFICE

DOMINICK FABIO, OF ST. PAUL, MINNESOTA, ASSIGNOR OF ONE-HALF TO ANTHONY DELMONT, OF ST. PAUL, MINNESOTA

AUTOMOBILE SEAT STRUCTURE

Application filed June 19, 1929. Serial No. 372,124.

The present invention relates to automobile seats for those of the closed type and has for its prime object provision of means whereby the seat may be converted into a bed or lounge.

Another very important object of the invention resides in the provision of an automobile seat arrangement whereby the back of the front seat is mounted so as to be capable of swinging down to a position in substantial co-planar relation with the back seat.

Another very important object of the invention resides in the provision of convenient and easily manipulated means for operating the back and front seats, either to raise or lower the same.

A still further very important object of the invention resides in the provision of an automobile seat arrangement and structure of this nature which is simple, inexpensive to manufacture and install, thoroughly efficient and reliable in operation, and otherwise well adapted for the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a vertical longitudinal section taken through the body of an automobile showing my improved seat arrangement mounted therein, Figure 2 is a top plan view thereof, showing the back of the front seat lowered and the cushion of the front seat turned around, Figure 3 is a sectional view through the front seat, Figure 4 is a horizontal section taken substantially on the line 4—4 of Figure 3, Figure 5 is a rear elevation of the front seat, Figure 6 is a detail section taken substantially on the line 6—6 of Figure 4, and, Figure 7 is an enlarged detail section taken substantially on the line 7—7 of Figure 4.

Referring to the drawings in detail, it will be seen that the numeral 5 denotes the floor of the body of a closed type automobile, from which rises the back 6 of the rear seat, the cushion 7 thereof being supported on box-like supporting structure 8 rising from the floor 5. A box-like supporting structure 9 also rises from the floor forwardly of the supporting structure 8 and has a U-shaped angle-iron frame 10 mounted thereon so that the bight or transverse portion thereof rests on the upper edge of the front wall of the box-like supporting structure 9 while the sides or legs thereof extend rearwardly. Rails 11 are supported under the sides of the frame 10 by means of a plurality of bolts 12 with spacers 14 thereon disposed between the rails and the sides to hold the rails in spaced relation thereto.

An angle-iron cross member 15 extends between the rear ends of the rails being fixed to the rear wall of the box-like supporting structure 9. A back 16 is hingedly connected to the cross member 15 as is indicated at 17 and has arcuate links 18 pivotally engaged therewith as at 19 and pivotally engaged with angular brackets 20 on the ends of a transverse slide bar 21 the ends of which are disposed in between the rails 11 and the sides of the frame 10, the bolts 12 and spacers 14 functioning as a stop.

A bearing 22 is mounted on the center of the transverse slide bar 21 and a screw shaft 23 is threaded therethrough and journalled through the center of the bight portion of the frame 10 and on its front end is provided with a hand crank 24. Obviously, by turning the shaft 23 by means of the hand crank 24, the bar 21 may be moved rearwardly to lower the back 16 or may be moved forwardly to raise the back 16. The conventional seat cushion 26 is mounted on the frame 10, but when the back is lowered the seat cushion is turned around as is indicated in Figure 2 for forming a more comfortable couch. When the back is lowered it is placed in substantial co-planar relationship with the back seat 7.

On the upper rear portion of the back 16 there is mounted a U-shaped rack 28, the ends of which are provided with inwardly directed pintles 29 journalled in bracket bearings 30 fixed on the back 16. When the back 16 is lowered this rack will function as a leg as is clearly indicated in the dotted line shown in Figures 1 and 3.

It is thought that the construction, operation, utility and advantages of this invention will now be quite apparent to those skilled in this art without a more detailed description thereof. The present embodiment of the invention has been disclosed in considerable detail merely for the purposes of exemplification, since in actual practice it attains the features of advantage enumerated as desirable in the statement of the invention and in the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A seat structure of the class described comprising a supporting frame, rails under the sides of the supporting frame, means for suspending the rails from the frame in spaced relation thereto, a transverse bar slidable between the rails and the frame, a back, means for hingedly mounting the back on the frame, links connected to the back and to the bar, and means for moving the bar forwardly and rearwardly to raise and lower the back.

2. A seat structure of the class described comprising a supporting frame, rails under the sides of the supporting frame, means for suspending the rails from the frame in spaced relation thereto, a transverse bar slidable between the rails and the frame, a back, means for hingedly mounting the back on the frame, links connected to the back and to the bar, and means for moving the bar forwardly and rearwardly to raise and lower the back, said means comprising a shaft journalled in the frame and threadedly engaged with the bar.

3. A seat structure of the class described comprising a supporting frame, rails under the sides of the supporting frame, means for suspending the rails from the frame in spaced relation thereto, a transverse bar slidable between the rails and the frame, a back, means for hingedly mounting the back on the frame, links connected to the back and to the bar, means for moving the bar forwardly and rearwardly to raise and lower the back, said means comprising a shaft journalled in the frame and threadedly engaged with the bar, a hand crank on the front edge of the shaft.

4. A seat structure of the class described comprising a supporting frame, rails under the sides of the supporting frame, means for suspending the rails from the frame in spaced relation thereto, a transverse bar slidable between the rails and the frame, a back, means for hingedly mounting the back on the frame, links connected to the back and to the bar, means for moving the bar forwardly and rearwardly to raise and lower the back, said means comprising a shaft journalled in the frame and threadedly engaged with the bar, a hand crank on the front edge of the shaft, a cushion supported on the frame, a rear seat, said back when lowered being in substantial co-planar relationship with the seat, a rack pivotally engaged on the back to swing to a perpendicular position when the back is lowered to function as a leg therefor.

5. A seat structure of the character described comprising a horizontally disposed substantially U-shaped supporting frame, a transverse bar rigidly connected to the opposite end portion of the supporting frame, a back hingedly connected at its lower end to the transverse bar for swinging movement thereon in a vertical plane, a transversely extending bar disposed in the frame and having its opposite end portions slidably disposed for longitudinal movement beneath the opposite sides of said frame, guide rails rigidly mounted in spaced, parallel relation on the lower side of the frame beneath the shiftable bar, means for securing the rails to the frame, certain of said means adapted for engagement by the shiftable bar in a manner to limit the movement thereof, links operatively connecting the back to the opposite end portions of the shiftable bar, a screw shaft journaled for rotation through the frame and operatively connected to the shiftable bar in a manner to actuate the same upon rotation of said screw shaft and an actuating crank fixed on the screw shaft forwardly of the frame.

In testimony whereof I affix my signature.

DOMINICK FABIO.